United States Patent
Toronyi et al.

(10) Patent No.: US 12,001,678 B2
(45) Date of Patent: Jun. 4, 2024

(54) ADDRESS TRANSLATION METADATA COMPRESSION IN MEMORY DEVICES

(71) Applicant: Micron Technology, Inc., Boise, ID (US)

(72) Inventors: Brian Toronyi, Boulder, CO (US); Scheheresade Virani, Frisco, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/895,696

(22) Filed: Aug. 25, 2022

(65) Prior Publication Data

US 2024/0069728 A1    Feb. 29, 2024

(51) Int. Cl.
*G06F 3/06* (2006.01)
*G06F 12/02* (2006.01)
*G06F 12/1009* (2016.01)

(52) U.S. Cl.
CPC .......... *G06F 3/0608* (2013.01); *G06F 3/0629* (2013.01); *G06F 3/0679* (2013.01); *G06F 12/0246* (2013.01); *G06F 12/1009* (2013.01)

(58) Field of Classification Search
None
See application file for complete search history.

(56) References Cited

U.S. PATENT DOCUMENTS

| | | | |
|---|---|---|---|
| 2017/0003881 A1* | 1/2017 | Amidi | G06F 3/0608 |
| 2018/0276114 A1* | 9/2018 | Kodama | G06F 3/0619 |
| 2019/0310780 A1* | 10/2019 | Gholamipour | G06F 3/0679 |
| 2021/0049104 A1* | 2/2021 | Das | G06F 12/0246 |
| 2022/0075732 A1* | 3/2022 | Palmer | G06F 12/04 |
| 2022/0083273 A1* | 3/2022 | Saito | G06F 3/0688 |

* cited by examiner

*Primary Examiner* — Kaushikkumar M Patel
(74) *Attorney, Agent, or Firm* — LOWENSTEIN SANDLER LLP

(57) ABSTRACT

An example memory sub-system includes a memory device and a processing device, operatively coupled to the memory device. The processing device is configured to receive a memory access request specifying a logical address of a data item and a memory access operation to be performed with respect to the data item; produce a truncated logical address by applying a predefined mathematical transformation to the specified logical address; identifying, in an address translation table, an address translation table entry identified by the truncated logical address; and perform the memory access operation using a physical address specified by the address translation table entry.

20 Claims, 10 Drawing Sheets

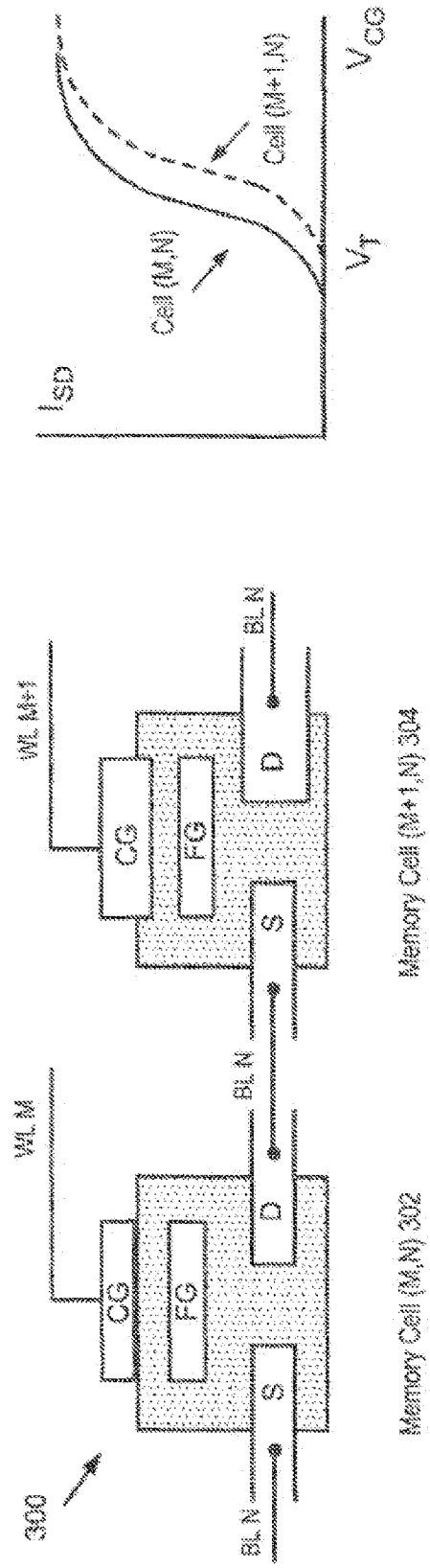
FIG. 3A
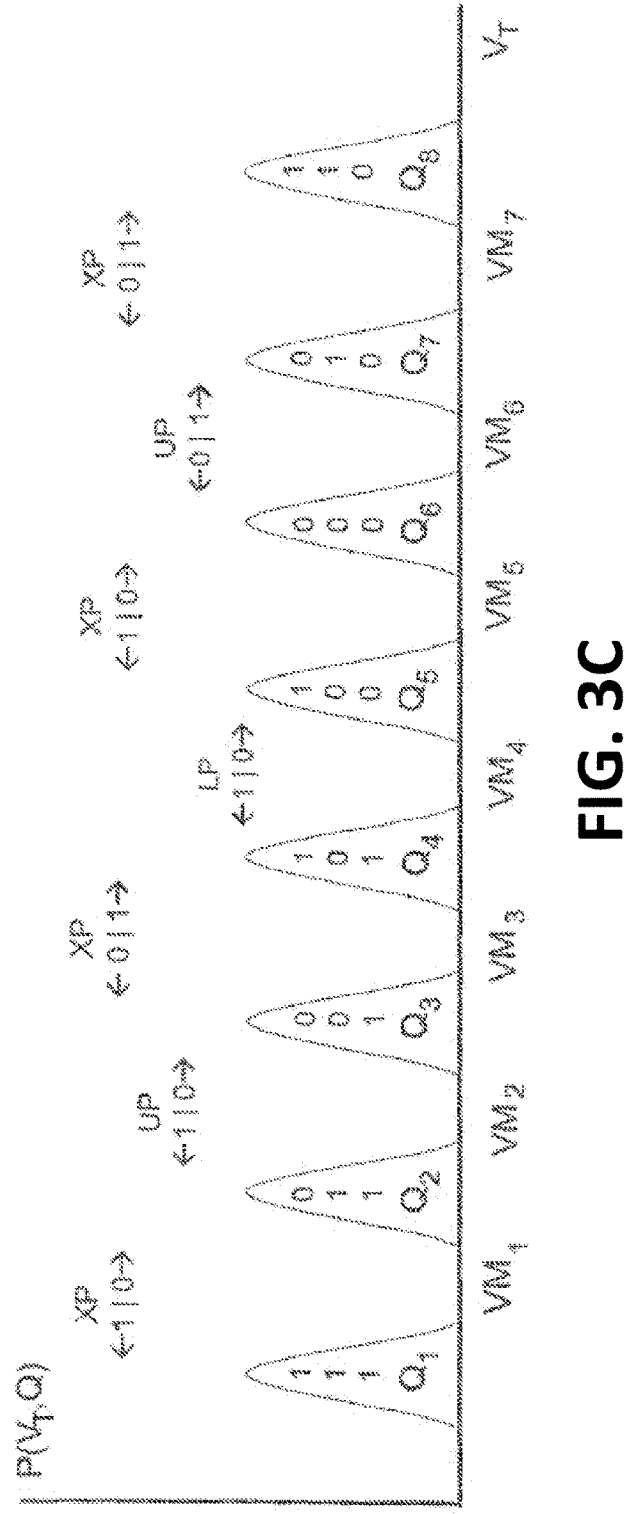
FIG. 3B
FIG. 3C

ADDRESS TRANSLATION METADATA COMPRESSION IN MEMORY DEVICES

TECHNICAL FIELD

Implementations of the disclosure are generally related to memory sub-systems, and more specifically, are related to methods of compressing address translation metadata for memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some implementations of the disclosure.

FIG. 3A schematically illustrates a set of memory cells as arranged in a memory device operating in accordance with aspects of the present disclosure.

FIG. 3B schematically illustrates dependence of the source-drain current on the control gate voltage for two memory cells of a memory device operating in accordance with aspects of the present disclosure.

FIG. 3C schematically illustrates an example distribution of threshold control gate voltages for a memory cell of a memory device operating in accordance with aspects of the present disclosure.

DETAILED DESCRIPTION

Figure 1:
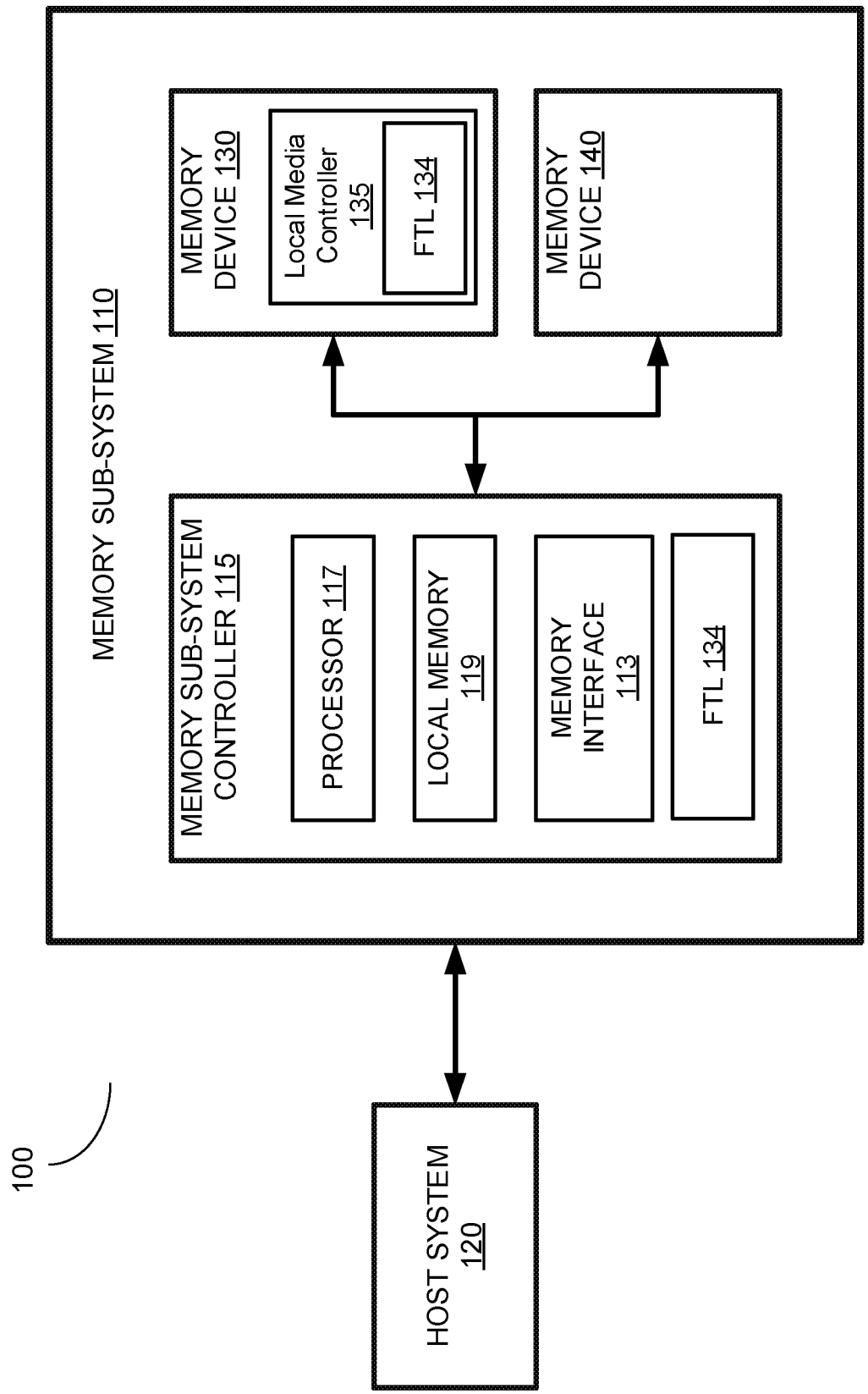
FIG. 1 illustrates an example computing system that includes a memory sub-system in accordance with aspects of the present disclosure.

Implementations of the present disclosure are directed to methods of compressing address translation metadata for memory devices. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can include two or more planes. For some types of non-volatile memory devices (e.g., NAND devices), each plane includes a set of physical blocks. In some implementations, each block can include multiple sub-blocks. Each plane carries a matrix of memory cells formed onto a silicon wafer and joined by conductors referred to as wordlines and bitlines, such that a wordline joins multiple memory cells forming a row of the matric of memory cells, while a bitline joins multiple memory cells forming a column of the matric of memory cells.

Depending on the cell type, each memory cell can store one or more bits of binary information, and has various logic states that correlate to the number of bits being stored. The logic states can be represented by binary values, such as "0" and "1", or combinations of such values. A set of memory cells referred to as a memory page can be programmed together in a single operation, e.g., by selecting consecutive bitlines.

Memory access operations (e.g., a programming (write) operation, an erase operation, etc.) can be executed with respect to sets of the memory cells, e.g., in response to receiving a memory access request from the host. A memory access request initiated by the host can specify the requested memory access operation (e.g., write, erase, read, etc.) and a logical address (e.g., represented by a logical block number (LBA) and an optional namespace identifier), which identifies the location that the host system associates with the data item to be read/written/erased by the requested memory access operation.

In order to isolate the host system from various aspects of physical implementations of memory devices employed by memory sub-systems, the memory sub-system can translate the logical address supplied by the host to a corresponding physical address identifying the physical location of the data item to be read/written/erased by the requested memory access operation. In some implementations, the physical address can include a channel identifier, a die identifier, a page identifier, a plane identifier and/or a frame identifier.

The address translation may be facilitated by an address translation table maintained by the memory sub-system for mapping each LBA to a corresponding physical address. The address translation table is referred to herein as a logical-to-physical (L2P) table. The L2P table can be maintained by the firmware of the memory sub-system controller and can be stored on one or more non-volatile memory devices of the memory sub-system. In order to improve the overall efficiency of the data transfer between a host system and a memory sub-system, the L2P table can at least partially be cached by one or more volatile memory devices of the memory sub-system. The memory sub-system controller may implement appropriate cache management policies in order to manage eviction of cache entries. In anticipation of asynchronous power loss (APL) events, the memory sub-system controller may periodically save the L2P table snapshots on a non-volatile memory device and/or maintain a journal of recent L2P updates.

In order to reduce the access latency, some memory sub-systems can store the entire L2P table on volatile memory devices (e.g., a dynamic random access memory (DRAM) device). However, the volatile memory capacity needed for storing the entire L2P table may be prohibitively high, e.g., for large capacity solid state drives (SSDs). For example, since each logical address points to a 4K TU (TU) (e.g., a page), the size of the L2P table for a 32 TB SSD would be 32 GB.

Implementations of the present disclosure address the above-noted and other challenges by implementing various methods for reducing the translation metadata size. In some implementations, larger (as compared to the legacy TU size) TUs can be utilized (also referred to as "bundle units"), which would result in reducing the overall number of the address translation table entries. In order to enable the larger Tus, the memory sub-system controller can divide the logical address by the ratio of the new TU size to the legacy TU size (e.g., by two for the TU size of 8K, by four for the TU size of 16K, etc.). This would effectively truncate the logical address by a predefined number of bits (e.g., by one bit for the TU size of 8K, by four for the TU size of 16K, etc.). The truncated logical address can then be utilized for indexing the L2P table. Therefore, the number of the L2P table entries will be reduced, thus reducing the overall size of the L2P table (e.g., to a half of its original capacity for the TU size of 8K, to a quarter of its original capacity for the TU size of 16K, etc.).

In some implementations, the L2P table entry size can be reduced by truncating each L2P table entry by a pre-defined number of least significant bits of the physical address. In an illustrative example, before storing an L2P table entry, the physical address can be shifted by a predefined number of bits (e.g., by two bits) to the right, thus effectively reducing the size of the L2P table entry by the predefined number of bits. When the L2P table entry is eventually retrieved, the physical address can be restored to its original size by shifting the retrieved physical address value by the predefined number of bits to the left and adding the predefined number of the least significant bits of the logical address.

Therefore, advantages of the systems and methods implemented in accordance with implementations of the present disclosure include, but are not limited to, effectively reducing the size of the address translation metadata thus lowering the amount of volatile memory that would be necessary for storing the address translation metadata.

FIG. 1 illustrates an example computing system 100 that includes a memory sub-system 110 in accordance with aspects of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some implementations, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some implementations, each of the memory devices 130 can include one or more arrays of memory cells such as SLCs, MLCs, TLCs, QLCs, or any combination of such. In some implementations, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 ("controller 115") can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some implementations, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another implementation of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some implementations, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some implementations, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some implementations, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In some implementations, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In some implementations, memory sub-system 110 includes a flash translation layer (FTL) module 134 configured to facilitate address translation for memory access operations, in response to receiving the memory access request from the host system 120. At least a portion of the FTL module 134 can be included by the memory sub-system controller 115 and/or local media controller 135. FTL module 134 can be implemented by one or more firmware components and/or one or more hardware components. In some implementations, at least part of the functionality of the FTL module 134 can be performed by the memory interface component 113. The FTL module 134 can translate a logical address (e.g., represented by a logical block number (LBA) and an optional namespace identifier), which is specified by a host-initiated memory access request, to a corresponding physical address identifying the physical location of the data item to be read/written/erased by the requested memory access operation. In some implementations, the physical address can include a channel identifier, a die identifier, a page identifier, a plane identifier and/or a frame identifier.

As noted herein above, the address translation can be facilitated by an L2P table, which can be stored on one or more non-volatile memory devices of the memory sub-system and can at least partially be cached by one or more volatile memory devices of the memory sub-system. The L2P table can be implemented as an array of L2P table entries indexed by values derived from the logical address (e.g., by the LBA), in which each L2P table entry stores a physical address corresponding to the logical address and can further store additional metadata, as described in more detail herein below.

In some implementations, in order to reduce the overall number of the L2P table entries, the FTL module 134 can utilize larger (as compared to the legacy TU size) TUs by indexing the L2P table using truncated logical addresses. In an illustrative example, the original (e.g., host-supplied) logical address can be divided by the chosen ratio of the new TU size to the legacy TU size (e.g., by two for the TU size of 8K, by four for the TU size of 16K, etc.). Provided that the chosen ratio of the new TU size to the legacy TU size can be expressed by a power of two (e.g., $2^1=2$, $2^2=4$, etc.), the division can be performed by shifting the logical address to the right by the number of bits equal to the power of two, thus truncating the logical address by a predefined number of bits (e.g., by one bit for the TU size of 8K, by four for the TU size of 16K, etc.). The truncated logical address can then be utilized for indexing the L2P table. Therefore, the number of the L2P table entries will be reduced, thus reducing the overall size of the L2P table (e.g., to a half of its original capacity for the TU size of 8K, to a quarter of its original capacity for the TU size of 16K, etc.).

In some implementations, the L2P table entry size can be reduced by the FTL module 134 truncating, by a pre-defined number of least significant bits, the physical addresses stored by the L2P table entries. In an illustrative example, before storing an L2P table entry, the FTL module 134 can shift the physical address by a predefined number of bits (e.g., by two bits) to the right, thus reducing the size of the L2P table entry by the predefined number of bits. When the L2P table entry is eventually retrieved, the FTL module 134 can restore the physical address to its original size by shifting the retrieved L2P table entry by the predefined number of bits to the left and adding the predefined number of the least significant bits of the logical address, as described in more detail herein below.

In various implementations, the FPL module 134 can simultaneously and/or selectively perform the described techniques for reducing the number of the L2P table entries and/or the L2P table entry size.

In operation, responsive to receiving a host-initiated memory access request, the FTL module 134 can translate the logical address specified by the host-initiated memory access request to a corresponding physical address identifying the physical location of the data item to be read/written/erased by the requested memory access operation. The memory sub-system controller 115 and/or local media controller 135 can then utilize the physical address for performing the requested memory access operation.

Figure 2:
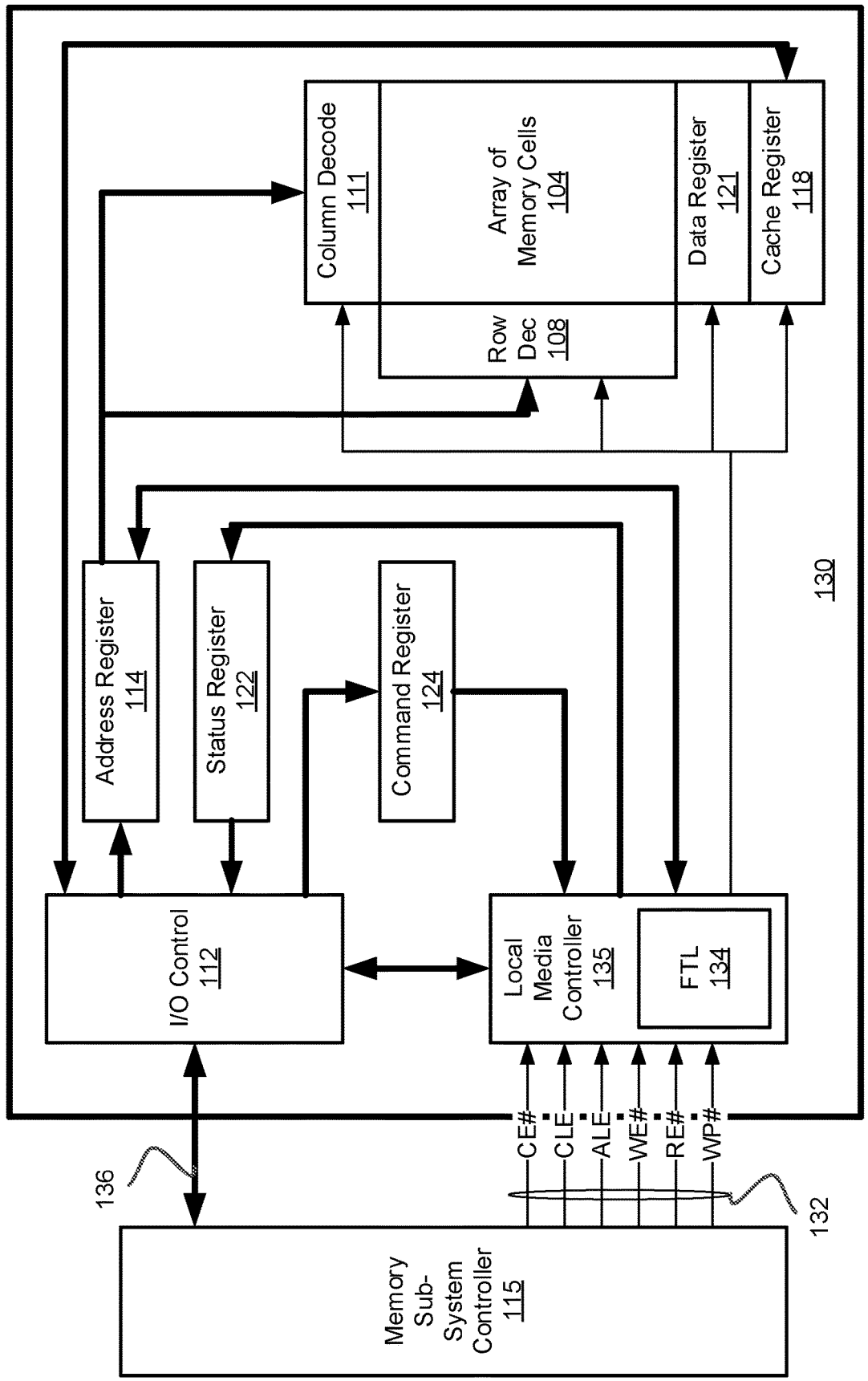
FIG. 2 is a block diagram of a memory device in communication with a memory sub-system controller of a memory sub-system, in accordance with aspects of the present disclosure.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), in accordance with aspects of the present disclosure. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 2) of at least a portion of array of memory cells 104 are capable of being programmed to one of at least two target data states.

Row decode circuitry 108 and column decode circuitry 111 are provided to decode address signals. Address signals are received and decoded to access the array of memory cells 104. Memory device 130 also includes input/output (I/O) control circuitry 112 to manage input of commands, addresses and data to the memory device 130 as well as output of data and status information from the memory device 130. An address register 114 is in communication with I/O control circuitry 112 and row decode circuitry 108 and column decode circuitry 111 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 111 to control the row decode circuitry 108 and column decode circuitry 111 in response to the addresses. In some implementations, local media controller 135 includes FTL module 134, which can implement the memory address translation, as described in more detail herein below.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a programming operation (e.g., a write operation), data may be passed from the cache register 118 to the data register 121 for transfer to the array of memory cells 104; then new data may be latched in the cache register 118 from the I/O control circuitry 112. During a read operation, data may be passed from the cache register 118 to the I/O control circuitry 112 for output to the memory sub-system controller 115; then new data may be passed from the data register 121 to the cache register 118. The cache register 118 and/or the data register 121 may form (e.g., may form a portion of) a page buffer of the memory device 130. A page buffer may further include sensing devices (not shown in FIG. 2) to sense a data state of a memory cell of the array of memory cells 104, e.g., by sensing a state of a data line connected to that memory cell. A status register 122 may be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In some implementations, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 112 and may then be written into command register 124. The addresses may be received over input/output (I/O) pins [7:0] of I/O bus 136 at I/O control circuitry 112 and may then be written into address register 114. The data may be received over input/output (I/O) pins [7:0] for an 8-bit device or input/output (I/O) pins [15:0] for a 16-bit device at I/O control circuitry 112 and then may be written into cache register 118. The data may be subsequently written into data register 121 for programming the array of memory cells 104.

In an implementation, cache register 118 may be omitted, and the data may be written directly into data register 120. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

In some implementations, additional circuitry and signals can be provided, and the memory device 130 of FIG. 2 has been simplified. It should be recognized that the functionality of the various block components described with reference to FIG. 2 may not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) may be used in the various implementations.

Figure 4:
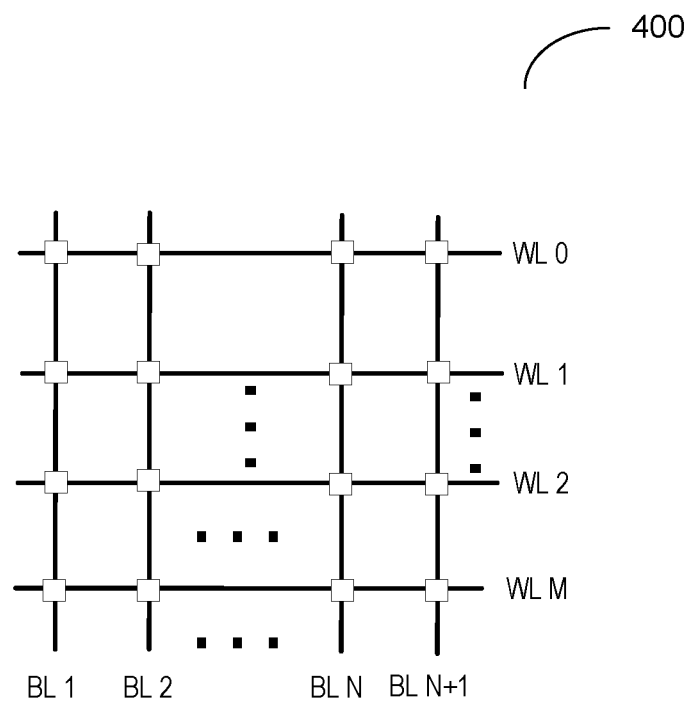
FIG. 4 schematically illustrates an example memory array operating in accordance with aspects of the present disclosure.

One or more memory devices of the memory sub-system 100 can be represented, e.g., by NAND memory devices that utilize transistor arrays built on semiconductor chips. As illustrated schematically in FIG. 3A, a memory cell of a memory device can be a transistor, such as a metal-oxide-semiconductor field effect transistor (MOSFET), having a source (S) electrode and a drain (D) electrode to pass electric current there through. The source and drain electrodes can be connected to a conductive bitline (BL), which can be shared by multiple memory cells. A memory device can include an array or memory cells that are connected to a plurality of wordlines (WL) and a plurality of bitlines (BL), as schematically illustrated by FIG. 4. A memory device can further include circuitry for selectively coupling WLs and BLs to voltage sources providing control gate and source-drain signals, which is omitted from FIG. 4 for clarity and conciseness.

Referring again to FIG. 3A, memory cells 302 and 304 can be connected to the same bitline N and two different conductive wordlines, M and M+1, respectively. A memory cell can further have a control gate (CG) electrode to receive a voltage signal VCG to control the magnitude of electric current flowing between the source electrode and the drain electrode. More specifically, there can be a threshold control gate voltage VT (herein also referred to as "threshold voltage" or simply as "threshold") such that for VCG<VT, the source-drain electric current can be low, but can increase substantially once the control gate voltage has exceeded the threshold voltage, VCG>VT. Transistors of the same memory device can be characterized by a distribution of their threshold voltages, P(VT)=dW/dVT, so that dW=P(VT)dVT represents the probability that any given transistor has its threshold voltage within the interval [VT,VT+dVT]. For example, FIG. 3B illustrates schematically dependence of the source-drain current ISD on the control gate voltage for two memory cells, e.g. memory cell 302 (solid line) and memory cell 304 (dashed line), having different threshold control gate voltages.

To make a memory cell non-volatile, the cell can be further equipped with a conducting island—a charge storage node—that can be electrically isolated from the control gate, the source electrode, and the drain electrode by insulating layers (depicted in FIG. 3A as the dotted region). In response to an appropriately chosen positive (in relation to the source potential) control gate voltage VCG, the charge storage node can receive an electric charge Q, which can be permanently stored thereon even after the power to the memory cell—and, consequently, the source-drain current—is ceased. The charge Q can affect the distribution of threshold voltages P(VT,Q). Generally, the presence of the electric charge Q shifts the distribution of threshold voltages towards higher voltages, compared with the distribution P(VT) for an uncharged charge storage node. This happens because a stronger positive control gate voltage VCG can be needed to overcome a negative potential of the charge storage node charge Q. If any charge of a sequence Qk of charges with $1 \le k \le 2N$ can be selectively programmed (and later detected during a read operation) into a memory cell, the memory cell can function as an N-bit storage unit. The charges $Q_k$ are preferably selected to be sufficiently different from each other, so that any two adjacent voltage distributions $P(VT, Q_k)$ and $P(VT, Q_{k+1})$ do not overlap being separated by a valley margin, so that 2N distributions $P(VT, Q_k)$ are interspaced with 2N−1 valley margins.

FIG. 3C illustrates schematically a distribution of threshold control gate voltages for a memory cell capable of storing three bits of data by programming the memory cell into at least eight charge states that differ by the amount of charge on the cell's charge storage node. FIG. 3C shows distributions of threshold voltages $P(VT, Q_k)$ for 2N=8 different charge states of a tri-level cell (TLC) separated with 23−1=7 valley margins VMk. Accordingly, a memory cell programmed into a charge state k-th (i.e., having the charge $Q_k$ deposited on its charge storage node) can be storing a particular combination of N bits (e.g., 0110, for N=4). This charge state $Q_k$ can be determined during a readout operation by detecting that a control gate voltage VCG within the valley margin VMk is sufficient to open the cell to the source-drain current whereas a control gate voltage within the preceding valley margin VMk−1 is not.

Figure 5:
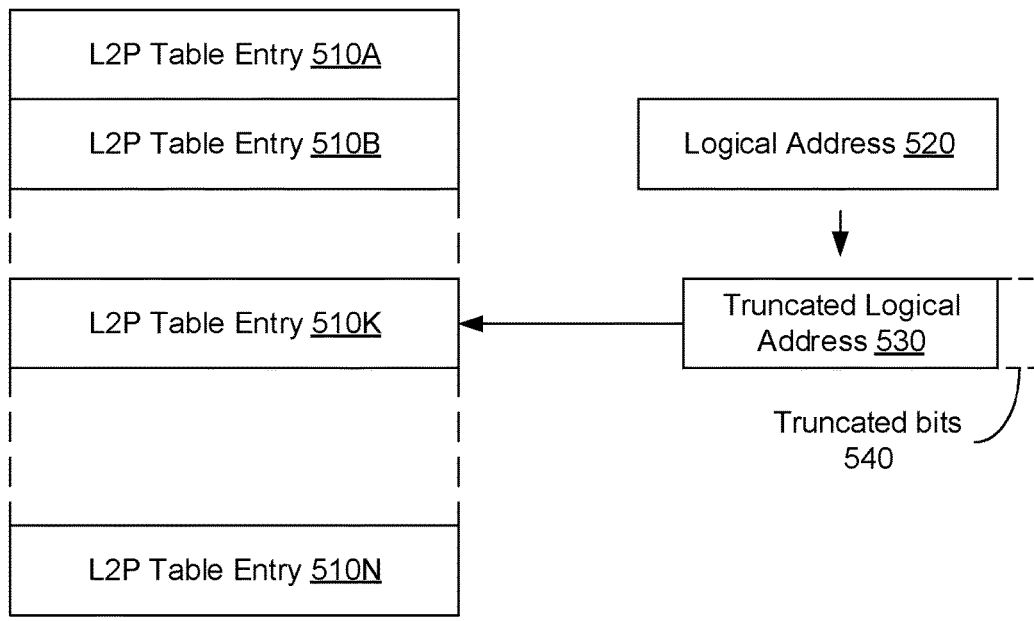
FIG. 5 schematically illustrates an example address translation operation using truncated logical addresses for enabling large TUs, in accordance with aspects of the present disclosure.

FIG. 5 schematically illustrates an example address translation operation using truncated logical addresses for enabling large TUs (also referred to as "bundled units"), in accordance with aspects of the present disclosure. As shown in FIG. 5, the controller can maintain an L2P table 500, which can be implemented as a linear array of L2P table entries 510A-510N that are indexed by the values derived from the logical addresses. In other words, each L2P table entry 510 can store a physical address corresponding to the logical address (e.g., LBA value) value from which the index of the L2P table entry has been derived.

In some implementations, each L2P table entry 510 can store the result of applying the exclusive disjunction (exclusive or, XOR) operation to the PA and LBA (i.e., PA^LBA), thus reserving the binary value of all "ones" (0xFFFFFFFF) for unmapped LBAs. In some implementations, each L2P table entry 510 can further store one or more metadata items associated with the logical address.

Accordingly, for a specified logical address, the index of the corresponding L2P table entry can be computed by applying a predefined mathematical transformation to the logical address:

$i = F(LBA)$, where i is the index value (e.g., the ordinal number of the L2P table entry in the L2P table), and F denotes the mathematical transformation applied to the logical address.

In some implementations, the mathematical transformation can be represented by a function that simply returns its argument, in which case the index value (e.g., the ordinal number of the L2P table entry in the L2P table) would be equal to original logical address (e.g., the LBA supplied by the host), i.e., i=LBA.

Alternatively, in order to reduce the metadata table size, the mathematical transformation can truncate the original logical address before indexing the address translation table, thus resulting in larger (as compared to the legacy TU size).

In an illustrative example, the original logical address can be divided by the chosen ratio of the new TU size to the legacy TU size (e.g., by two for the TU size of 8K, by four for the TU size of 16K, etc.), i.e., i=LBA/k, where k is the chosen ratio of the new TU size to the legacy TU size.

Provided that the chosen ratio of the new TU size to the legacy TU size can be expressed by a power of two (e.g., $2^1=2$, $2^2=4$, etc.), the division can be performed by shifting the logical address to the right by the number of bits equal to the power of two, thus truncating the logical address by a predefined number of bits (e.g., by one bit for the TU size of 8K, by four for the TU size of 16K, etc.), i.e., i=LBA>>log 2(k), where k is the chosen ratio of the new TU size to the legacy TU size and >>denotes the right bit shifting operation.

As schematically illustrated by FIG. 5, the original logical address 520 can be shifted to the right by a predefined number of bits (this discarding the predefined number of least significant bits 540) to produce the truncated logical address 530. The latter address can then be utilized for identifying the L2P table entry 510K.

Therefore, the number of the L2P table entries will be reduced, thus reducing the overall size of the L2P table (e.g., to a half of its original capacity for the TU size of 8K, to a quarter of its original capacity for the TU size of 16K, etc.).

Figure 6:
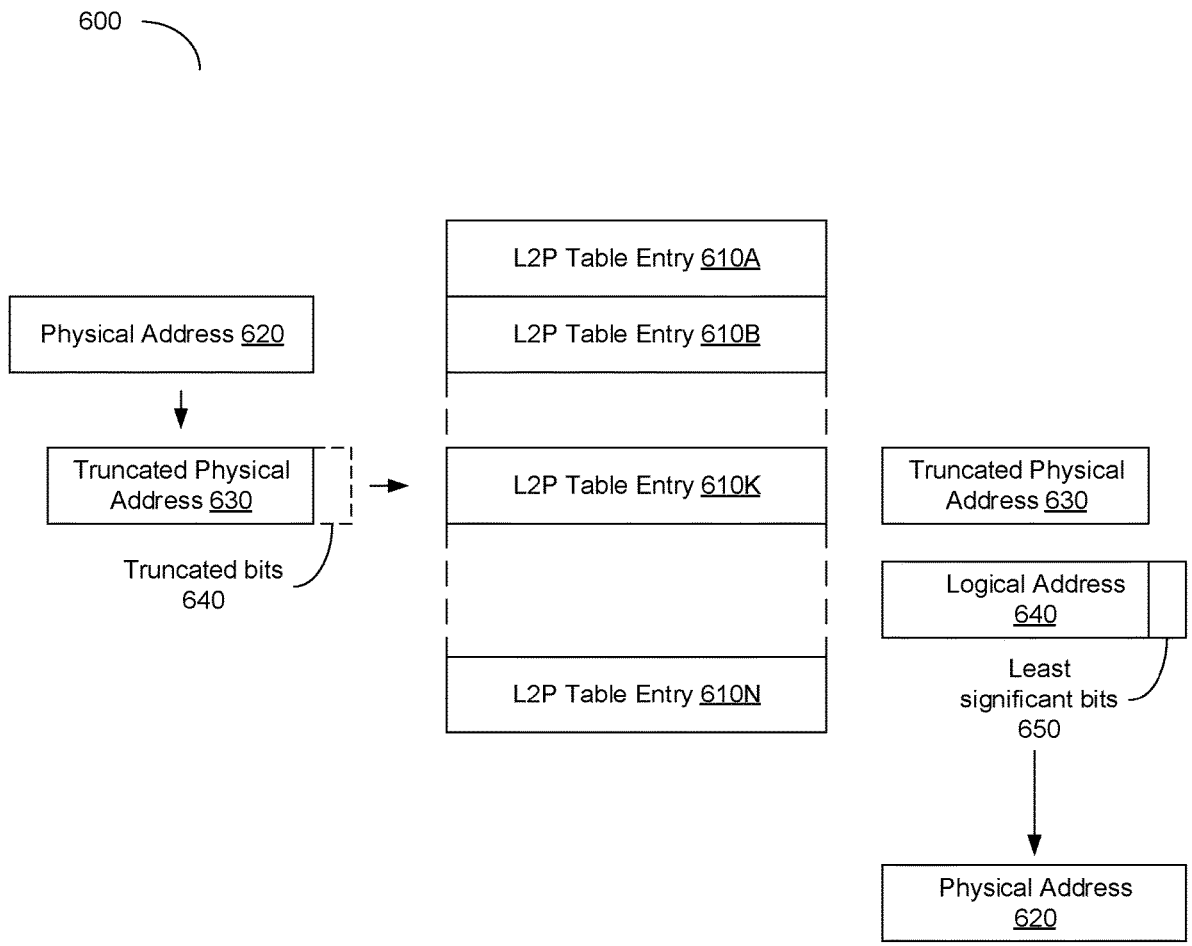
FIG. 6 schematically illustrates an example address translation operation using truncated physical addresses, in accordance with aspects of the present disclosure.

FIG. 6 schematically illustrates an example address translation operation using truncated physical addresses, in accordance with aspects of the present disclosure. As shown in FIG. 6, the controller can maintain an L2P table 600, which can be implemented as a linear array of L2P table entries 610A-610N that are indexed by the values derived from the logical addresses. In other words, each L2P table entry 610 can store a physical address corresponding to the logical address (e.g., LBA value) from which the index of the L2P table entry has been derived.

Accordingly, for a specified logical address, the index of the corresponding L2P table matches the logical address: i=LBA. In some implementations, each L2P table entry 610 can store the result of applying the exclusive disjunction (exclusive or, XOR) operation to the PA and LBA (i.e., PA^LBA), thus reserving the binary value of all "ones" (0xFFFFFFFF) for unmapped LBAs. In some implementations, each L2P table entry 610 can further store one or more metadata items associated with the logical address.

As noted herein above, in order to reduce the L2P table entry size, the FTL module 134 can truncate, by a predefined number of least significant bits, the physical addresses stored by the L2P table entries. In an illustrative example, before storing an L2P table entry 610K, the FTL module 134 can shift the physical address 620 by a predefined number of bits (e.g., by two bits) to the right, thus producing the truncated physical address 630 by discarding the predefined number of least significant bits 640. When the L2P table entry 610K is eventually retrieved in response to a memory access request, the FTL module 134 can restore the physical address 620 to its original size by shifting, by the predefined number of bits to the left, the truncated physical address 630 extracted from the L2P table entry 610K, followed by adding the predefined number of the least significant bits 650 of the logical address 640.

Figure 7:
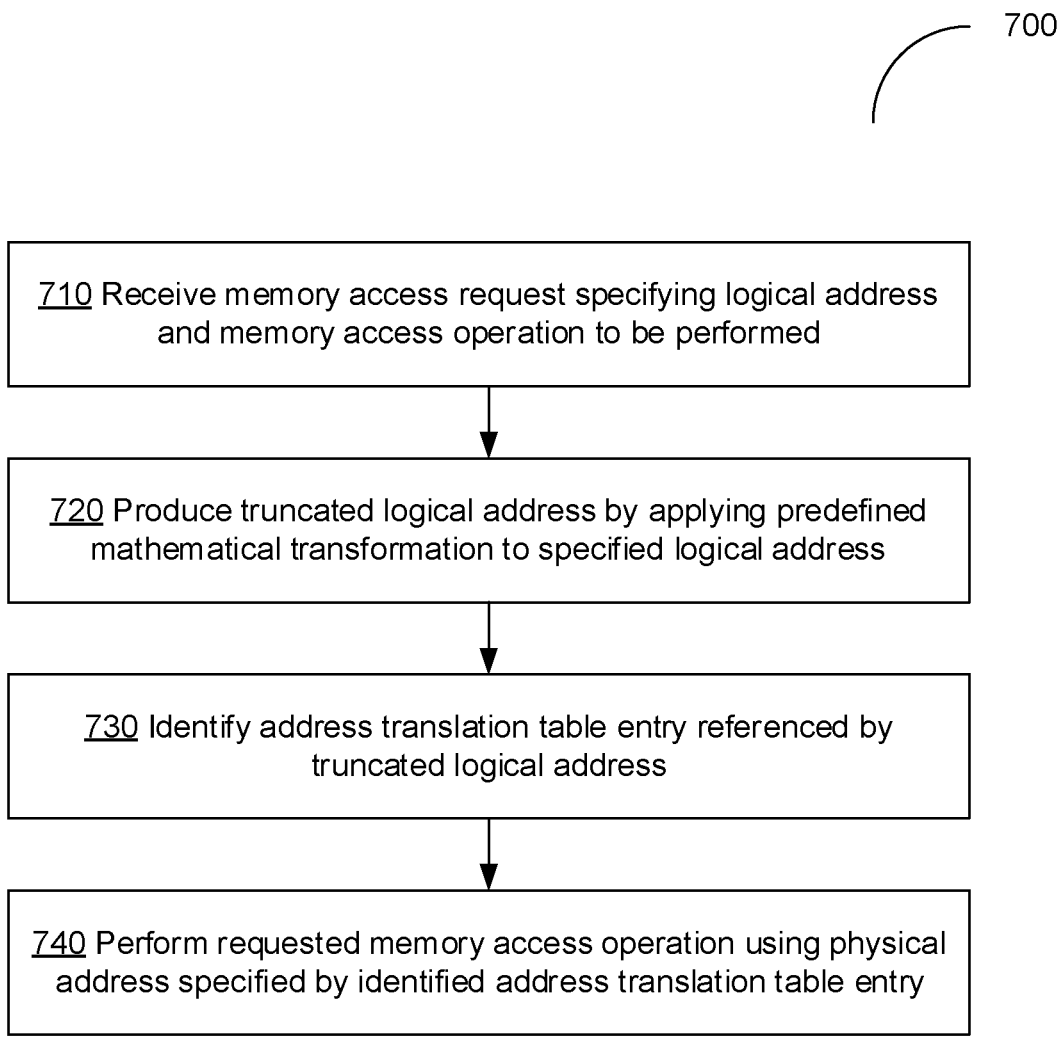
FIG. 7 is a flow diagram of an example method of logical-to-physical address translation implemented by a controller operating in accordance with aspects of the present disclosure.

FIG. 7 is a flow diagram of an example method 700 of logical-to-physical address translation implemented by a controller (e.g., a memory sub-system controller or a local media controller) operating in accordance with aspects of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 700 is performed by the FTL 174 of FIGS. 1-2. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible.

At operation 710, the controller implementing the method receives (e.g., from the host system) a memory access request specifying a logical address of a data item and a memory access operation to be performed with respect to the data item. In various illustrative examples, the memory access operation can be, e.g., a read, write, or erase operation, as described in more detail herein above.

At operation 720, the controller applies a predefined mathematical transformation to the specified logical address, thus producing a truncated logical address. In an illustrative example, the predefined mathematical transformation may divide the specified logical address by a predefined integer value, which can represent the ratio of the larger TU size to the legacy TU size. In some implementations, a parameter representing the ratio can be stored in a metadata area of the memory device, and can be retrieved by the controller, e.g., upon reset or power-up.

Provided that the chosen ratio of the new TU size to the legacy TU size can be expressed by a power of two (e.g., $2^1=2$, $2^2=4$, etc.), the division operation can be performed by shifting the logical address to the right by the number of bits equal to the power of two, thus truncating the logical address by a predefined number of bits, as described in more detail herein above.

At operation 730, the controller identifies, in an address translation table, an address translation table entry referenced by the truncated logical address. In an illustrative example, the address translation table can be represented by a logical-to-physical (L2P) table comprising a plurality of L2P table entries, such that each L2P table entry maps a logical address specified by an index of the L2P table entry in the L2P table to a corresponding physical address specifying a location of a data item on the memory device, as described in more detail herein above.

At operation 740, the controller performs the memory access operation using a physical address specified by the identified address translation table entry, as described in more detail herein above.

Figure 8:
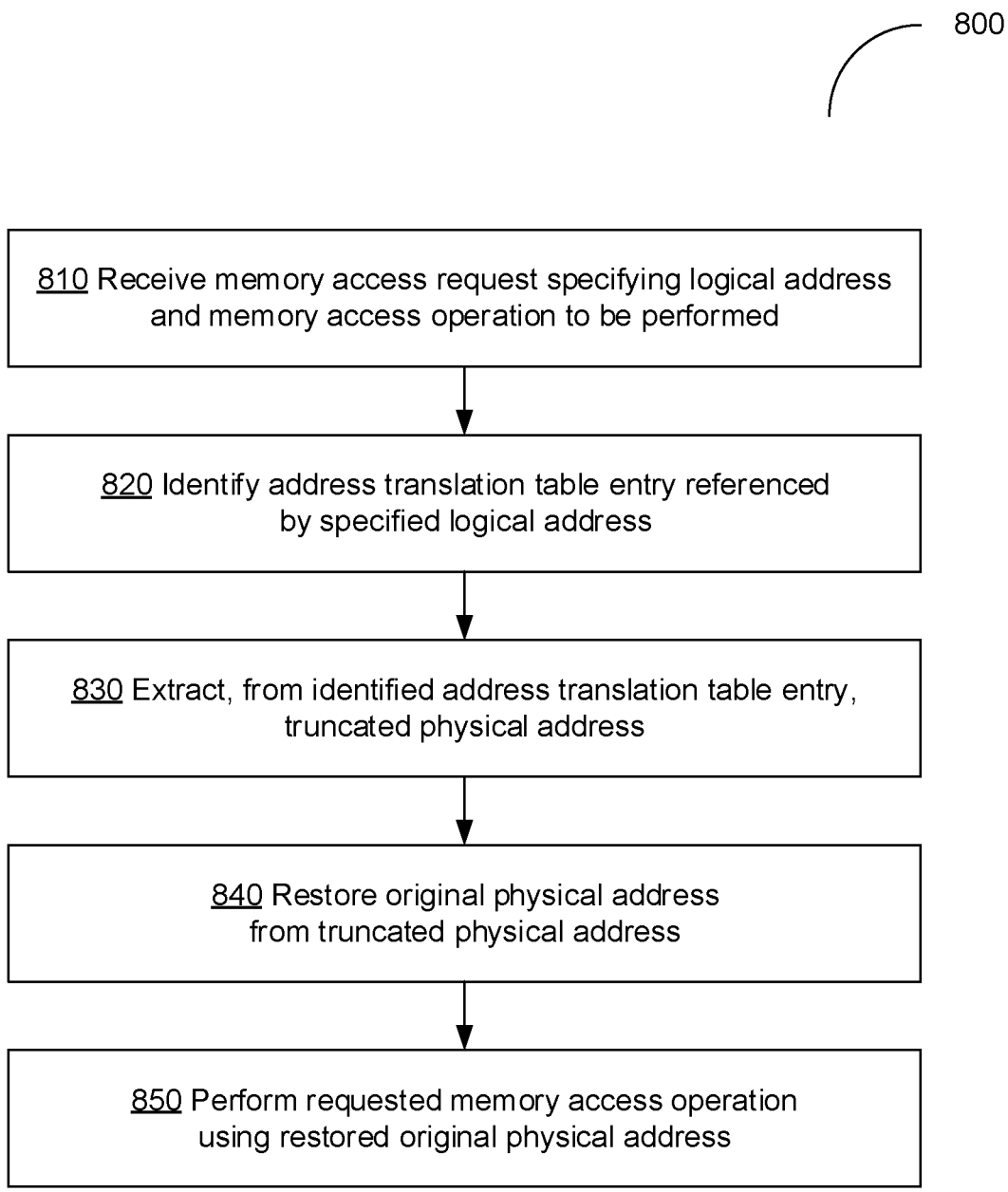
FIG. 8 is a flow diagram of another example method of logical-to-physical address translation implemented by a controller operating in accordance with aspects of the present disclosure.

FIG. 8 is a flow diagram of an example method 800 of logical-to-physical address translation implemented by a controller (e.g., a memory sub-system controller or a local media controller) operating in accordance with aspects of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 800 is performed by the FTL 184 of FIGS. 1-2. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible.

At operation 810, the controller implementing the method receives (e.g., from the host system) a memory access request specifying a logical address of a data item and a memory access operation to be performed with respect to the data item. In various illustrative examples, the memory access operation can be, e.g., a read, write, or erase operation, as described in more detail herein above.

At operation 820, the controller identifies, in an address translation table, an address translation table entry referenced by the specified logical address. In an illustrative example, the address translation table can be represented by a logical-to-physical (L2P) table comprising a plurality of L2P table entries, such that each L2P table entry maps a logical address specified by an index of the L2P table entry in the L2P table to a corresponding physical address specifying a location of a data item on the memory device, as described in more detail herein above.

At operation 830, the controller extracts a truncated physical address specified by the identified address translation table entry.

At operation 840, the controller restores the original physical address from the truncated physical address. In an illustrative example, restoring the original physical address may be performed by shifting, by the predefined number of bits to the left, the truncated physical address extracted from the L2P table entry, followed by adding the predefined number of the least significant bits of the logical address. In some implementations, a parameter representing the predefined number of bits can be stored in a metadata area of the memory device, and can be retrieved by the controller, e.g., upon reset or power-up.

At operation 850, the controller performs the memory access operation using the restored original physical address, as described in more detail herein above.

Figure 9:
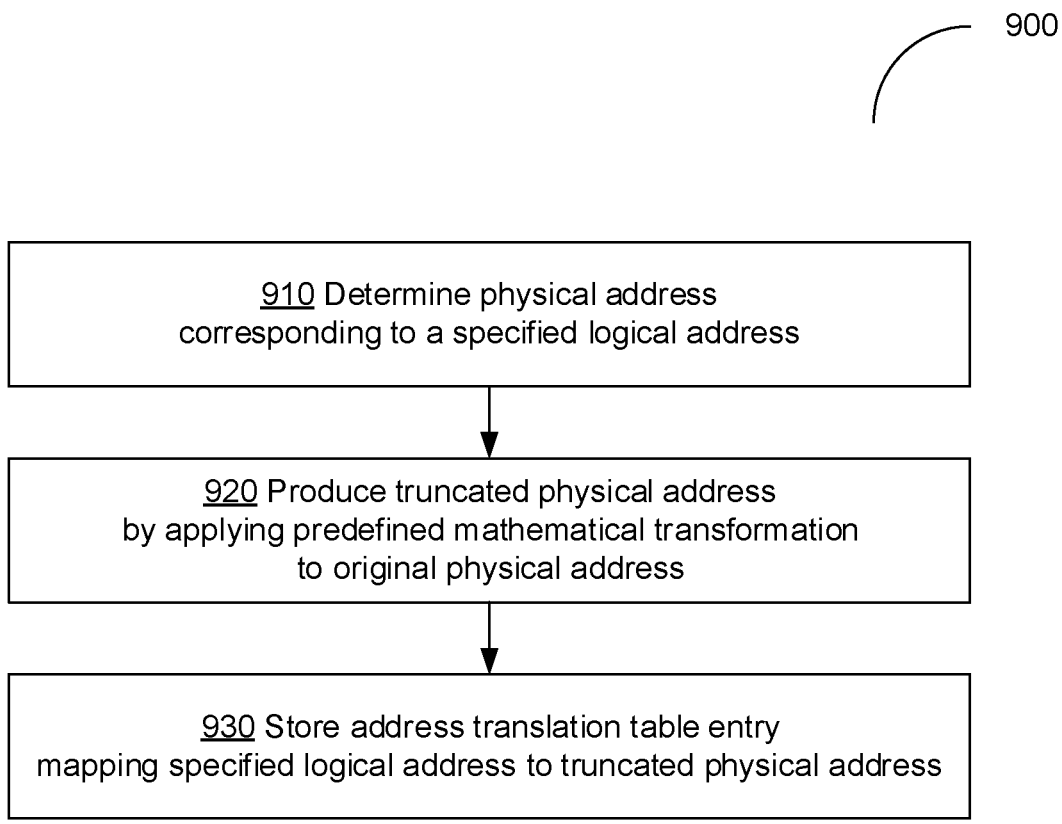
FIG. 9 is a flow diagram of an example method of logical-to-physical address translation implemented by a controller operating in accordance with aspects of the present disclosure.

FIG. 9 is a flow diagram of an example method 900 of logical-to-physical address translation implemented by a controller (e.g., a memory sub-system controller or a local media controller) operating in accordance with aspects of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 900 is performed by the FTL 194 of FIGS. 1-2. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible.

At operation 910, the controller implementing the method determines a physical address corresponding to a specified logical address, wherein the physical address specifies a location, on the memory device, of a data item referenced by the specified logical address. In an illustrative example, when a new data item is being stored by the host to the memory device, the next available physical address associated with the current cursor can be chosen for storing the new data item.

At operation 920, the controller produces a truncated physical address by applying a predefined mathematical transformation to the determined physical address. In an illustrative example, the controller can shift the physical address by the predefined number of bits to the right, thus reducing the size of the address translation table entry by the predefined number of bits. In some implementations, a parameter representing the number of bits can be stored in a metadata area of the memory device, and can be retrieved by the controller, e.g., upon reset or power-up.

At operation 930, the controller stores, in an address translation table, an address translation table entry mapping the specified logical address to the truncated physical address. In an illustrative example, the address translation table can be represented by a logical-to-physical (L2P) table comprising a plurality of L2P table entries, such that each L2P table entry maps a logical address specified by an index of the L2P table entry in the L2P table to a corresponding physical address specifying a location of a data item on the memory device, as described in more detail herein above.

The address translation table entry can be eventually retrieved in response to a memory access request specifying the logical address that identifies the address translation table entry. Upon retrieving the address translation table entry, the controller can restore the physical address to its original size by shifting, by the predefined number of bits to the left, the truncated physical address extracted from the address translation table entry, followed by adding the predefined number of the least significant bits of the specified logical address. The restored physical address can be utilized for performing the requested memory access operation, as described in more detail herein above.

Figure 10:
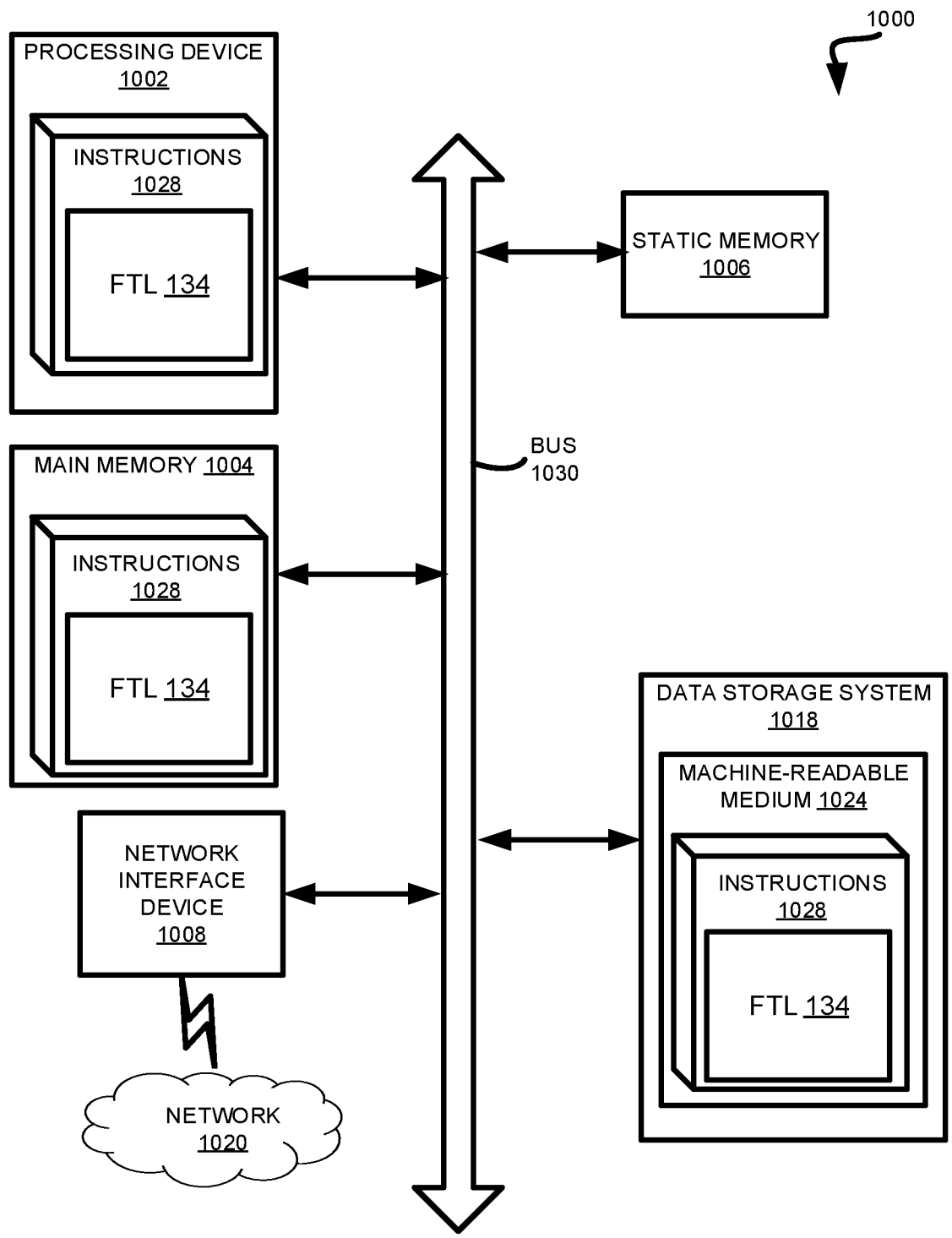
FIG. 10 is a block diagram of an example computer system in which implementations of the present disclosure can operate.

FIG. 10 illustrates an example machine of a computer system 1000 within which a set of instructions, for causing the machine to perform any one or more of the methodologies discussed herein, can be executed. In some implementations, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the FTL module 134 of FIGS. 1-2). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1028 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1028 or software embodying any one or more of the methodologies or functions described herein. The instructions 1028 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In some implementations, the instructions 1028 include instructions to implement functionality corresponding to the FTL module 134 of FIGS. 1-2. While the machine-readable storage medium 1024 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    receiving, by a controller managing a memory device, a memory access request specifying a logical address of a data item and a memory access operation to be performed with respect to the data item;
    identifying, in an address translation table, an address translation table entry referenced by the logical address;
    determining a truncated physical address specified by the address translation table entry;
    restoring an original physical address from the truncated physical address, wherein the original physical address specifies a location of the data item on the memory device; and
    performing the memory access operation using the original physical address.

2. The method of claim 1, wherein the address translation table is represented by a logical-to-physical (L2P) table comprising a plurality of L2P table entries, each L2P table entry mapping a logical address specified by an index of the L2P table entry in the L2P table to a corresponding truncated physical address.

3. The method of claim 1, wherein the address translation table is at least partially stored in a volatile memory.

4. The method of claim 1, wherein restoring the original physical address from the truncated physical address further comprises:
    producing a shifted physical address shifting the truncated physical address by a predefined number of bits; and
    adding, to the shifted physical address, a value represented by the predefined number of least significant bits of the logical address.

5. The method of claim 4, wherein the predefined number of bits is specified by a configuration parameter associated with the memory device.

6. The method of claim 1, wherein the address translation table entry further comprises additional metadata associated with the logical address.

7. A computer-readable non-transitory storage medium comprising executable instructions that, when executed by a controller managing a memory device, cause the controller to:
    determine a physical address corresponding to a specified logical address, wherein the physical address specifies a location, on the memory device, of a data item referenced by the specified logical address;
    produce a truncated physical address by applying a predefined mathematical transformation to the determined physical address; and
    store, in an address translation table, an address translation table entry mapping the specified logical address to the truncated physical address.

8. The computer-readable non-transitory storage medium of claim 7, wherein the address translation table is represented by a logical-to-physical (L2P) table comprising a plurality of L2P table entries, each L2P table entry mapping a logical address specified by an index of the L2P table entry in the L2P table to a corresponding truncated physical address.

9. The computer-readable non-transitory storage medium of claim 7, wherein the address translation table is at least partially stored in a volatile memory.

10. The computer-readable non-transitory storage medium of claim 7, wherein the address translation table entry further comprises additional metadata associated with the logical address.

11. The computer-readable non-transitory storage medium of claim 7, further comprising executable instructions that, when executed by the controller managing, cause the controller to:
    receive a memory access request specifying the logical address and a memory access operation to be performed with respect to the data item referenced by the logical address;
    identify, in the address translation table, the address translation table entry referenced by the logical address;
    determine the truncated physical address specified by the address translation table entry;
    restore the physical address from the truncated physical address; and
    perform the memory access operation using the original physical address.

12. The computer-readable non-transitory storage medium of claim 11, wherein restoring the original physical address from the truncated physical address further comprises:
producing a shifted physical address shifting the truncated physical address by a predefined number of bits; and
adding, to the shifted physical address, a value represented by the predefined number of least significant bits of the logical address.

13. The computer-readable non-transitory storage medium of claim 7, further comprising executable instructions that, when executed by the controller managing, cause the controller to:
produce a truncated logical address by applying a second predefined mathematical transformation to the specified logical address.

14. The computer-readable non-transitory storage medium of claim 13, wherein applying the second predefined mathematical transformation to the specified logical address further comprises:
shifting the specified logical address by a predefined number of bits.

15. A system comprising:
a memory device; and
a processing device, operatively coupled to the memory device, wherein the processing device is configured to:
receive a memory access request specifying a logical address of a data item and a memory access operation to be performed with respect to the data item;
identify, in an address translation table, an address translation table entry referenced by the logical address;
determine a truncated physical address specified by the address translation table entry;
restore an original physical address from the truncated physical address, wherein the original physical address specifies a location of the data item on the memory device; and
perform the memory access operation using the original physical address.

16. The system of claim 15, wherein the address translation table is represented by a logical-to-physical (L2P) table comprising a plurality of L2P table entries, each L2P table entry mapping a logical address specified by an index of the L2P table entry in the L2P table to a corresponding truncated physical address.

17. The system of claim 15, wherein the address translation table is at least partially stored in a volatile memory.

18. The system of claim 15, wherein restoring the original physical address from the truncated physical address further comprises:
producing a shifted physical address shifting the truncated physical address by a predefined number of bits; and
adding, to the shifted physical address, a value represented by the predefined number of least significant bits of the logical address.

19. The system of claim 18, wherein the predefined number of bits is specified by a configuration parameter associated with the memory device.

20. The system of claim 15, wherein the address translation table entry further comprises additional metadata associated with the logical address.

* * * * *